United States Patent
Nakajima et al.

(10) Patent No.: US 9,023,488 B2
(45) Date of Patent: May 5, 2015

(54) STEEL SHEET FOR HOT PRESSING AND METHOD OF MANUFACTURING HOT-PRESSED PART USING STEEL SHEET FOR HOT PRESSING

(75) Inventors: Seiji Nakajima, Tokyo (JP); Tatsuya Miyoshi, Tokyo (JP); Hiroki Nakamaru, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 111 days.

(21) Appl. No.: 13/813,328

(22) PCT Filed: Aug. 2, 2011

(86) PCT No.: PCT/JP2011/067680
§ 371 (c)(1),
(2), (4) Date: Jan. 30, 2013

(87) PCT Pub. No.: WO2012/018014
PCT Pub. Date: Feb. 9, 2012

(65) Prior Publication Data
US 2013/0122322 A1 May 16, 2013

(30) Foreign Application Priority Data

| Aug. 4, 2010 | (JP) | 2010-174957 |
| Jan. 5, 2011 | (JP) | 2011-000553 |
| Apr. 18, 2011 | (JP) | 2011-091633 |
| Jul. 19, 2011 | (JP) | 2011-157378 |

(51) Int. Cl.
| B32B 15/04 | (2006.01) |
| B32B 15/18 | (2006.01) |
| B21D 31/00 | (2006.01) |
| C22C 38/00 | (2006.01) |
| C23C 30/00 | (2006.01) |
| B21D 22/20 | (2006.01) |
| B32B 15/01 | (2006.01) |
| C22C 18/00 | (2006.01) |
| C22C 19/03 | (2006.01) |
| C22C 38/02 | (2006.01) |
| C22C 38/04 | (2006.01) |
| C22C 38/06 | (2006.01) |
| C22C 38/28 | (2006.01) |
| C22C 38/32 | (2006.01) |
| C22C 38/60 | (2006.01) |
| C23C 28/02 | (2006.01) |
| C25D 5/14 | (2006.01) |
| C21D 8/02 | (2006.01) |
| C25D 3/56 | (2006.01) |

(Continued)

(52) U.S. Cl.
CPC ............ *C22C 38/00* (2013.01); *B32B 15/043* (2013.01); *B32B 15/18* (2013.01); *C23C 30/00* (2013.01); *C23C 30/005* (2013.01); *B21D 22/20* (2013.01); *B32B 15/015* (2013.01); *C22C 18/00* (2013.01); *C22C 19/03* (2013.01); *C22C 38/001* (2013.01); *C22C 38/02* (2013.01); *C22C 38/04* (2013.01); *C22C 38/06* (2013.01); *C22C 38/28* (2013.01); *C22C 38/32* (2013.01); *C22C 38/60* (2013.01); *C23C 28/02* (2013.01); *C23C 28/025* (2013.01); *C25D 5/14* (2013.01); *B21D 22/208* (2013.01); *C21D 8/0278* (2013.01); *C21D 1/673* (2013.01); *C25D 3/562* (2013.01); *C25D 3/565* (2013.01); *C25D 5/50* (2013.01); *C22C 38/38* (2013.01)

(58) Field of Classification Search
CPC ...... B32B 15/01; B32B 15/015; B32B 15/04; B32B 15/043; B32B 15/18; C23C 28/02; C23C 28/025; C23C 28/021; C23C 30/00; C23C 20/005; C22C 18/00; C22C 19/03; C22C 38/00; C22C 38/001; C22C 38/02; C22C 38/04; C22C 38/06; C22C 38/14; C22C 38/18; C22C 38/28; C22C 38/32; C22C 38/38; C22C 38/60
USPC ......... 428/577, 587, 632, 633, 639, 652, 653, 428/660, 641, 658, 659, 678, 679, 680, 684, 428/685, 213, 215, 219
See application file for complete search history.

(56) References Cited

U.S. PATENT DOCUMENTS 5,422,192 A * 6/1995 Takahashi et al. ............ 428/632
6,517,955 B1 2/2003 Takada et al.
(Continued)

FOREIGN PATENT DOCUMENTS

| CN | 1497065 A | 5/2004 |
| CN | 101144162 A | 3/2008 |

(Continued)

OTHER PUBLICATIONS

International Search Report dated Oct. 18, 2011, application No. PCT/JP2011/067680.
(Continued)

*Primary Examiner* — Michael E La Villa
(74) *Attorney, Agent, or Firm* — RatnerPrestia

(57) ABSTRACT

In order to provide a steel sheet for hot pressing from which a hot-pressed part excellent in perforation corrosion resistance is obtainable and a method of manufacturing a hot-pressed part using the steel sheet for hot pressing, provided is a steel sheet for hot pressing having, sequentially on a surface of a base steel sheet: a plating layer I containing 60% by mass or more of Ni and the remainder consisting of Zn and inevitable impurities, a coating mass thereof being 0.01 to 5 g/m$^2$; and a plating layer II containing 10 to 25% by mass of Ni and the remainder consisting of Zn and inevitable impurities, a coating mass thereof being 10 to 90 g/m$^2$.

20 Claims, No Drawings

(51) Int. Cl.
*C25D 5/50* (2006.01)
*C22C 38/38* (2006.01)
*C21D 1/673* (2006.01)

(56) References Cited

U.S. PATENT DOCUMENTS

| | | |
|---|---|---|
| 6,756,134 B2 | 6/2004 | Hodgens et al. |
| 7,687,152 B2 | 3/2010 | Ikematsu et al. |
| 2001/0042393 A1 | 11/2001 | Kefferstein et al. |
| 2004/0058189 A1 | 3/2004 | Hodgens et al. |
| 2004/0166360 A1 | 8/2004 | Imai et al. |
| 2009/0297881 A1 | 12/2009 | Maalman et al. |

FOREIGN PATENT DOCUMENTS

| | | |
|---|---|---|
| CN | 101619474 A | 1/2010 |
| GB | 1490535 | 11/1977 |
| JP | 7-166371 A | 6/1995 |
| JP | 11-350198 A | 12/1999 |
| JP | 2003-73774 A | 3/2003 |
| JP | 2003-129209 A | 5/2003 |
| JP | 2004-115914 A | 4/2004 |
| JP | 2004124207 | 4/2004 |
| JP | 2005-113233 | 4/2005 |
| JP | 3663145 | 4/2005 |
| JP | 2005240072 | 9/2005 |
| JP | 4039548 | 11/2007 |
| JP | 2011074409 | 4/2011 |
| RU | 2312162 C2 | 12/2007 |
| RU | 2371516 | 10/2009 |
| RU | 2384648 C2 | 3/2010 |
| SU | 1733505 | 5/1992 |

OTHER PUBLICATIONS

Taiwanese Office Action dated Sep. 6, 2013, application No. 100127564.
Russian Notice of Allowance mailed Feb. 20, 2014, application No. 2013104193/02(006149).
Chinese Office Action mailed Mar. 17, 2014, application No. 201180037013.0.
Entire patent prosecution history of U.S. Appl. No. 14/123,872, filed Dec. 4, 2013, entitled, "Steel Sheet for Hot Pressing and Process for Manufacturing Hot Pressed Member Using the Steel Sheet."
Russian Notice of Allowance mailed Nov. 7, 2014, application No. 2013123693/02.
Office Action mailed Jan. 30, 2015, U.S. Appl. No. 13/988,915.

* cited by examiner

STEEL SHEET FOR HOT PRESSING AND METHOD OF MANUFACTURING HOT-PRESSED PART USING STEEL SHEET FOR HOT PRESSING

CROSS REFERENCE TO RELATED APPLICATIONS

This application is the U.S. National Phase application of PCT International Application No. PCT/JP2011/067680, filed Aug. 2, 2011, and claims priority to Japanese Patent Application Nos. 2010-174957, filed Aug. 4, 2010, 2011-000553, filed Jan. 5, 2011, 2011-091633, filed Apr. 18, 2011, and 2011-157378, filed Jul. 19, 2011, the contents of which applications are incorporated by reference herein for all purposes.

FIELD OF THE INVENTION

The present invention relates to a steel sheet for hot pressing, the steel sheet being suitable for manufacturing a part such as a chassis part or body structural part of an automobile by hot pressing, and to a method of manufacturing a hot-pressed part using the steel sheet for hot pressing.

BACKGROUND OF THE INVENTION

Conventionally, many of parts, such as chassis parts and body structural parts of automobiles, have been manufactured by press forming steel sheets having certain strength. In recent years, from the viewpoint of global environmental conservation, weight reduction of automotive bodies has been strongly desired, and efforts have been continuously made to increase the strength of steel sheets to be used and to reduce their thickness. However, since press formability of steel sheets decreases as the strength of the sheet steels increases, many of the sheet steels are becoming more difficult to be formed into desired shapes.

Accordingly, Patent Literature 1 proposes a forming technique called hot pressing, which enables both of simplification of forming and strengthening by quenching a steel sheet simultaneously with forming of the heated steel sheet using a mold constituted of a die and a punch. However, as for this hot pressing, since the steel sheet is heated to a high temperature of around 950° C. before the hot pressing, scales (iron oxide) are formed on a surface of the steel sheet. Accordingly, the scales formed on the surface of the steel sheet, by being peeled off upon the hot pressing, damage the mold or damage the surface of the part after the hot pressing. Further, the scales remaining on the surface of the part cause defects in appearance and decrease in paint adhesion. Accordingly, the scales on the surface of the part are usually removed by performing a treatment such as pickling or shot blasting, but this makes the manufacturing process complicated and results in decrease in productivity. Further, parts such as chassis parts or body structural parts of automobiles also require excellent corrosion resistance, but anti-rust coating such as a plating layer is not provided on a hot-pressed part manufactured by the above-mentioned process and hence, the corrosion resistance is very insufficient.

In view of such background, a hot pressing technique capable of suppressing formation of scales upon heating before hot pressing and improving corrosion resistance of parts after the hot pressing is being demanded, and a steel sheet provided with a coating such as a plating layer on a surface thereof and a method of hot pressing using it have been proposed. For example, Patent Literature 2 discloses a method of manufacturing a hot-pressed part having excellent corrosion resistance, in which a steel sheet coated with Zn or Zn-based alloy is hot pressed and a Zn—Fe-based compound or a Zn—Fe—Al-based compound is provided on a surface thereof. Further, Patent Literature 3 discloses a hot-pressed product (part) excellent in workability, weldability, and corrosion resistance, which is formed by heating at 700° C. to 1000° C. for 2 to 20 minutes and thereafter hot pressing a galvannealed steel sheet, and providing a plating layer including a Fe—Zn solid solution phase on a surface thereof.

CITATION LIST

Patent Literature

Patent Literature 1: UK Patent No. 1490535
Patent Literature 2: Japanese Patent No. 3663145
Patent Literature 3: Japanese Patent No. 4039548

SUMMARY OF THE INVENTION

There has been a problem that the hot-pressed part described in Patent Literature 2 or Patent Literature 3 is inferior in corrosion resistance with respect to perforation corrosion (hereinafter, referred to as "perforation corrosion resistance") liable to occur at a portion to which a chemical conversion coating or an electrodeposition coating film is unable to reach and be applied.

The present invention provides a steel sheet for hot pressing from which a hot-pressed part excellent in perforation corrosion resistance is obtainable and a method of manufacturing a hot-pressed part using the steel sheet for hot pressing.

The inventors obtained the findings below as a result of diligent study on steel sheets for hot pressing.

(1) The inferior perforation corrosion resistance of the hot-pressed part manufactured using the steel sheet on which the Zn or Zn-based alloy plated layer described in Patent Literature 2 or Patent Literature 3 is caused by considerable decrease in sacrificial protection effect against corrosion that Zn inherently has due to Zn in the plating layer being diffused in the steel sheet beneath the plating layer, that is, a base steel sheet of the plating layer and taken into an Fe—Zn solid-solution phase or forming a large amount of zinc oxide on the surface of the plating layer.

(2) In order to suppress the diffusion of Zn in the plating layer into the base steel sheet, it is effective to provide, on the surface of the steel sheet, a plating layer I, which contains 60% by mass or more of Ni and of which the remainder consists of Zn and inevitable impurities. Further, in order to suppress the formation of the large amount of zinc oxide on the surface of the plating layer, it is effective to provide, on the plating layer I, a plating layer II containing 10 to 25% by mass of Ni and the remainder consisting of Zn and inevitable impurities.

The present invention has been made based on the above findings, and provides a steel sheet for hot pressing, having sequentially on a surface of a base steel sheet: a plating layer I containing 60% by mass or more of Ni and the remainder consisting of Zn and inevitable impurities, a coating mass thereof being 0.01 to 5 g/m$^2$; and a plating layer II containing 10 to 25% by mass of Ni and the remainder consisting of Zn and inevitable impurities, a coating mass thereof being 10 to 90 g/m$^2$.

The steel sheet for hot pressing according to the present invention preferably further has, on the plating layer II, at least one kind of compound layer selected from: a Si-containing compound layer; a Ti-containing compound layer; an Al-containing compound layer; and a Zr-containing compound layer.

As the base steel sheet in the steel sheet for hot pressing according to the present invention, a steel sheet may be used, which has a component composition containing, in % by mass: 0.15 to 0.5% of C; 0.05 to 2.0% of Si; 0.5 to 3% of Mn; 0.1% or less of P; 0.05% or less of S; 0.1% or less of Al; and 0.01% or less of N, the remainder of the component composition consisting of Fe and inevitable impurities. This base steel sheet preferably contains either one or both of: at least one kind selected from, in % by mass, 0.01 to 1% of Cr, 0.2% or less of Ti, and 0.0005 to 0.08% of B; and 0.003 to 0.03% of Sb.

The present invention provides a method of manufacturing a hot-pressed part, including: heating the steel sheet for hot pressing according to the present invention to a temperature range from an $Ac_3$ transformation point to 1000° C.; and thereafter hot pressing the steel sheet for hot pressing. In the method of manufacturing a hot-pressed part according to an embodiment of the present invention, when heating to the temperature range from the $Ac_3$ transformation point to 1000° C., the heating is performed at an average rate of temperature increase of 100° C./s or greater.

According to the present invention, it is possible to manufacture a steel sheet for hot pressing from which a hot-pressed part excellent in perforation corrosion resistance is obtainable. The hot-pressed part manufactured by a method of the present invention of manufacturing the hot-pressed part using the steel sheet of the present invention for hot pressing is suitable for a part such as a chassis part or body structural part of an automobile.

DESCRIPTION OF EMBODIMENTS (1) Steel Sheet for Hot Pressing
(1-1) Plating Layer

In an embodiment of the present invention, in order to suppress diffusion of Zn in a plating layer into a base steel sheet and obtain excellent perforation corrosion resistance, a plating layer I, which contains 60% by mass or more of Ni, and of which the remainder consists of Zn and inevitable impurities is provided on a surface of the steel sheet. This is because when the amount of Ni in the plating layer I is less than 60% by mass, it is impossible to sufficiently suppress the diffusion of Zn in the plating layer into the base steel sheet and obtain adequate perforation corrosion resistance. The amount of Ni in the plating layer I is preferably 100% by mass, but if less than 100% by mass, the remainder is: Zn that has sacrificial protection effect against corrosion; and inevitable impurities. Further, a coating mass of the plating layer I is 0.01 to 5 g/m² per side. This is because when the coating mass is less than 0.01 g/m², the effect of suppressing the diffusion of Zn into the base steel sheet is not sufficiently exhibited, and when the coating mass exceeds 5 g/m², the effect is saturated and invites increase in costs.

In an embodiment of the present invention, in order to suppress the formation of a large amount of zinc oxide on the surface of a plating layer and obtain excellent perforation corrosion resistance, a plating layer II is provided on the above mentioned plating layer I. The plating layer II contains 10 to 25% by mass of Ni and the remainder consists of Zn and inevitable impurities. This is because by setting the amount of Ni in the plating layer II to 10 to 25% by mass, a γ phase having a crystal structure of any of $Ni_2Zn_{11}$, $NiZn_3$, or $Ni_5Zn_{21}$ and a high melting point of 881° C. is formed, thereby suppressing to the minimum a zinc oxide forming reaction on the surface of the plating layer during heating. Further, this is because the plating layer II having such a composition remains as the γ phase even after completion of the hot pressing, thereby exhibiting excellent perforation corrosion resistance by the sacrificial protection effect of Zn against corrosion. The formation of the γ phase when the amount of Ni is 10 to 25% by mass is not necessarily consistent with an equilibrium diagram for Ni—Zn alloy. This is considered to be because a plating-layer forming reaction performed by an electroplating method or the like proceeds in non-equilibrium. The γ phase of $Ni_2Zn_{11}$, $NiZn_3$, or $Ni_5Zn_{21}$ may be confirmed by an X-ray diffraction method or an electron diffraction method using transmission electron microscopy (TEM). Further, although the γ phase is, as described above, formed by setting the amount of Ni in the plating layer II to 10 to 25% by mass, some η phase may also be present depending on conditions or the like of the electroplating. In this case, in order to suppress the zinc oxide forming reaction on the surface of the plating layer during the heating, the amount of the η phase is preferably 5% by mass or less. The amount of the η phase is defined by a weight ratio of the η phase to a total weight of the plating layer II, and for example, may be determined by an anodic dissolution method.

The coating mass of the plating layer II is 10 to 90 g/m² per side. When the coating mass is less than 10 g/m², the sacrificial protection effect of Zn against corrosion is not sufficiently exhibited, and when the coating mass of the plating layer II exceeds 90 g/m², the effect is saturated and increase in costs is caused.

Although a method of forming the plating layer I or the plating layer II is not particularly limited, a well-known electroplating method is suitable.

If at least one kind of compound layer selected from a Si-containing compound layer, a Ti-containing compound layer, an Al-containing compound layer, and a Zr-containing compound layer is further provided on the plating layer II, excellent painting adhesion is obtained. In order to obtain such an effect, a thickness of the compound layer is preferably 0.1 μm or greater. Further, a thickness of the compound layer is preferably 3.0 μm or less. This is because when the thickness of the compound layer is equal to or less than 3.0 μm, there is no possibility of inviting decrease in painting adhesion due to the compound layer becoming brittle. The thickness of the compound layer is more preferably within the range of 0.4 to 2.0 μm.

As the Si-containing compound, for example, a silicone resin, lithium silicate, sodium silicate, colloidal silica, a silane coupling agent, or the like is applicable. As the Ti-containing compound, for example, titanate such as lithium titanate or calcium titanate, a titanium coupling agent containing titanium alkoxide or a chelate-type titanium compound as a base agent, or the like, is applicable. As the Al-containing compound, for example, aluminate such as sodium aluminate or calcium aluminate, an aluminum coupling agent containing aluminum alkoxide or a chelate-type aluminum compound as a base agent, or the like is applicable. As a Zr-containing compound, for example, zirconate such as lithium zirconate or calcium zirconate, a zirconium coupling agent containing zirconium alkoxide or a chelate-type zirconium compound as a base agent, or the like is applicable.

In order to form the above-mentioned compound layer on the plating layer II, onto the plating layer II, adhesion treatment of at least one kind of compound selected from the above-mentioned Si-containing compound, Ti-containing compound, Al-containing compound and Zr-containing compound may be performed, and thereafter, heat drying may be performed without washing with water. The adhesion treatment for these compounds may be any of a coating process, a dipping process, and a spray process; and a roll coater, a squeeze coater, a die coater, or the like may be used. After a coating treatment, a dipping treatment, or a spray treatment, by the squeeze coater or the like, adjustment of an amount of coating, regularization of appearance, or uniformization of thickness is possible by an air knife method or a squeeze roll method. Furthermore, heat drying may be performed with the maximum attained temperature of the steel sheet being within a range of 40 to 200° C., and preferably within a range of 60 to 160° C.

The method of forming the above-mentioned compound layer on the plating layer II is not limited to the above-mentioned method. For example, it is also possible to form the above-mentioned compound layer on the plating layer II by a method of performing a reactive treatment of dipping the steel sheet having the plating layer I and the plating layer II in an acidic aqueous solution containing at least one kind of cation selected from Si, Ti, Al, and Zr and at least one kind of anion selected from phosphate ion, fluoric acid ion, and fluoride ion and thereafter heat drying with washing with water or without washing with water.

The above-mentioned compound layer may contain an inorganic solid lubricant. This is because by inclusion of the inorganic solid lubricant, a coefficient of dynamic friction upon hot pressing is decreased and press formability is improved.

As the inorganic solid lubricant, at least one kind selected from a metal sulfide (molybdenum disulfide, tungsten disulfide, or the like), a selenium compound (molybdenum selenide, tungsten selenide, or the like), graphite, a fluoride (graphite fluoride, calcium fluoride, or the like), a nitride (boron nitride, silicon nitride, or the like), borax, mica, metallic tin, and an alkali metal sulfate (sodium sulfate, potassium sulfate, or the like) may be applicable. A content of the above-mentioned inorganic solid lubricant in the compound layer is preferably 0.1 to 20% by mass. This is because when the content is 0.1% by mass or greater, a lubrication effect is obtained and when the content is 20% by mass or less, painting adhesion is not degraded.

(1-2) Base Steel Sheet

In order to obtain the hot-pressed part having a tensile strength (TS) of 980 MPa or greater, as a base steel sheet of a plating layer, for example, a hot-rolled steel sheet or a cold-rolled steel sheet having a component composition, which contains, in % by mass, 0.15 to 0.5% of C, 0.05 to 2.0% of Si, 0.5 to 3% of Mn, 0.1% or less of P, 0.05% or less of S, 0.1% or less of Al, and 0.01% or less of N, and of which the remainder consists of Fe and inevitable impurities, may be used. The reason for limiting the content of each component element is explained below. Here, "%" representing the content of the component means "% by mass" unless otherwise specified.

C: 0.15 to 0.5%

C is an element that improves strength of steel and in order to make the TS of the hot-pressed part to 980 MPa or greater, the content needs to be 0.15% or greater. If the content of C exceeds 0.5%, blanking workability of the steel sheet as the base material is remarkably deteriorated. Therefore, the content of C is 0.15 to 0.5%.

Si: 0.05 to 2.0%

Si is, similarly to C, an element that improves strength of steel and in order to increase the TS of the hot-pressed part to 980 MPa or greater, the content needs to be 0.05% or greater. If the content of Si exceeds 2.0%, generation of a surface defect called red scales is extremely enhanced upon hot-rolling and a rolling load is increased or ductility of the hot-rolled steel sheet is deteriorated. Further, if the content of Si exceeds 2.0%, in performing a plating treatment of forming a plating film mainly containing Zn or Al on a surface of the steel sheet, plating treatability may be adversely affected. Therefore, the content of Si is 0.05 to 2.0%.

Mn: 0.5 to 3%

Mn is an element effective for improving hardenability by suppressing ferrite transformation, and lowers an $Ac_3$ transformation point, and hence is also effective for lowering a heating temperature before hot pressing. In order to exhibit such effects, the content needs to be 0.5% or greater. If the content of Mn exceeds 3%, Mn segregates, and uniformity of characteristics of the steel sheet as the base material and the hot-pressed part is degraded. Therefore, the content of Mn is 0.5 to 3%.

P: 0.1% or Less

When the content of P exceeds 0.1%, P segregates, and uniformity of characteristics of the steel sheet as the base material and the hot-pressed part is degraded and toughness thereof is also significantly lowered. Therefore, the content of P is 0.1% or less.

S: 0.05% or Less

When the content of S exceeds 0.05%, toughness of the hot-pressed part is lowered. Therefore, the content of S is 0.05% or less.

Al: 0.1% or Less

When the content of Al exceeds 0.1%, blanking workability or hardenability of the steel sheet as the base material is deteriorated. Therefore, the content of Al is 0.1% or less.

N: 0.01% or Less

When the content of N exceeds 0.01%, a nitride of AlN is formed upon hot-rolling, or upon heating before hot pressing, and blanking workability or hardenability of the steel sheet as the base material is deteriorated. Therefore, the content of N is 0.01% or less.

The remainder of the above-mentioned components of the base steel sheet is Fe and inevitable impurities, but for the following reasons, one or both of: at least one kind selected from 0.01 to 1% of Cr, 0.2% or less of Ti, and 0.0005 to 0.08% of B; and 0.003 to 0.03% of Sb, may be contained.

Cr: 0.01 to 1%

Cr is an element effective for strengthening steel and improving hardenability thereof. In order to exhibit such effects, the content of Cr is preferably 0.01% or greater. If the content of Cr exceeds 1%, costs are significantly increased, and thus, the upper limit of the content of Cr is 1%.

Ti: 0.2% or Less

Ti is an element effective for strengthening steel and improving toughness by grain refining. Further, it is also effective for forming a nitride in preference to B mentioned below and exhibiting the effect of improving hardenability by solute B. However, if the content of Ti exceeds 0.2%, rolling load upon hot-rolling is extremely increased and the toughness of the hot-pressed part is lowered, and thus the upper limit of the content of Ti is preferably 0.2%.

B: 0.0005 to 0.08%

B is an element effective for improving hardenability upon hot pressing and toughness after hot pressing. In order to exhibit such effects, the content of B is preferably 0.005% or greater. If the content of B exceeds 0.08%, the rolling load upon hot-rolling is extremely increased and a martensite phase or a bainite phase is formed after hot-rolling and cracks or the like in the steel sheet are generated, and thus the upper limit of the content of B is preferably 0.08%.

Sb: 0.003 to 0.03%

Sb is effective for suppressing a decarburized layer formed in a surface layer portion of the steel sheet during a period between heating of the steel sheet before hot pressing and cooling of the steel sheet via a series of processes of hot pressing. In order to exhibit such effects, the content needs to be 0.003% or greater. If the content of Sb exceeds 0.03%, a rolling load is increased and productivity is decreased. Therefore, the content of Sb is 0.003 to 0.03%.

(2) Method of Manufacturing Hot-Pressed Part

The above-mentioned steel sheet for hot pressing according to the present invention is hot-pressed preferably after being heated to a temperature range from the $Ac_3$ transformation point to 1000° C. and becomes the hot-pressed part. Heating up to a temperature equal to or higher than the $Ac_3$ transformation point before hot pressing is for forming a hard phase such as a martensite phase or the like by quenching upon hot pressing to increase strength of the part. Further, the upper limit of the heating temperature is 1000° C. because a large amount of zinc oxide is formed on the surface of the plating layer if the heating temperature exceeds 1000° C., and it becomes impossible to obtain sufficient perforation corrosion resistance. Here, the above-mentioned heating temperature means the maximum attained temperature of the steel sheet.

Further, when an average rate of temperature increase upon heating before hot pressing is 100° C./s or greater, it is possible to further suppress the formation of zinc oxide on the surface of the plating layer and to further improve the perforation corrosion resistance. The formation of zinc oxide on the surface of the plating layer is enhanced as a high temperature retention time under which the steel sheet is exposed under a high temperature condition is increased. Therefore, the greater the average rate of temperature increase, the shorter the high temperature retention time is able to be set, and as a result, it becomes possible to suppress the formation of zinc oxide on the surface of the plating layer. Here, the holding time at the maximum attained temperature of the steel sheet is not limited in particular, but in order to suppress the formation of zinc oxide, it is suitable to be shortened, and is preferably 300 seconds or shorter, and more preferably 60 seconds or shorter, and further preferably 10 seconds or shorter.

As a heating method before hot pressing: heating by an electric furnace, a gas furnace or the like; flame heating; conduction heating; high frequency heating; induction heating; or the like may be exemplified. In particular, in order to make the average rate of temperature increase 100° C./s or greater, the conduction heating, the high frequency heating, the induction heating, or the like is suitable.

Example 1

As base steel sheets, cold-rolled steel sheets having a component composition, which contains, in % by mass, 0.23% of C, 0.25% of Si, 1.2% of Mn, 0.01% of P, 0.01% of S, 0.03% of Al, 0.005% of N, 0.2% of Cr, 0.02% of Ti, 0.0022% of B, and 0.008% of Sb, and of which the remainder consists of Fe and inevitable impurities, and having an $Ac_3$ transformation point of 820° C. and a thickness of 1.6 mm were used. An electroplating treatment was performed on surfaces of these cold-rolled steel sheets by changing current densities from 5 to 100 A/dm$^2$ in a plating bath with a pH of 3.0 and a temperature of 50° C., which contained 200 g/L of nickel sulfate hexahydrate and 0 to 50 g/L of zinc sulfate heptahydrate, to form the plating layers I different in Ni contents and coating masses. Next, an electroplating treatment was performed by changing current densities from 5 to 100 A/dm$^2$ in a plating bath with a pH of 1.5 and a temperature of 50° C., which contained 200 g/L of nickel sulfate hexahydrate and 10 to 100 g/L of zinc sulfate heptahydrate, to form the plating layers II different in Ni contents, coating masses, and η phase contents.

Table 1 lists evaluation results of perforation corrosion resistance of each steel plate having the plating layer I and the plating layer II. Each of the steel sheets, Nos. 1 to 23, was heated in an electric furnace or by direct electric conduction and thereafter, cooled while being sandwiched between molds made of aluminum, and evaluation of the perforation corrosion resistance described below was performed. In Table 1, heating conditions and a cooling rate of each steel sheet are listed.

Perforation corrosion resistance: In order to evaluate the perforation corrosion resistance assuming a portion to which a chemical conversion coating or an electrodeposition coating film does not reach and is not applied, a sample was taken from the steel sheet after the heat treatment, a surface not to be evaluated and an end surface of the sample were sealed with a tape and thereafter, a complex corrosion test having a cycle of: salt spraying (an aqueous solution of 5% by mass of NaCl, 35° C., 2 hours); drying (60° C., a relative humidity of 20 to 30%, 4 hours); and wetting (50° C., a relative humidity of 95%, 2 hours) was performed for 150 cycles. Maximum decreases in the sheet thickness of the samples after the test were measured, and the evaluation was performed based on the following criteria. When a result of the evaluation was any of "A", "B", and "C", it was considered as satisfying an object of the present invention.

A: Maximum decrease in the sheet thickness≤0.1 mm
B: 0.1 mm<Maximum decrease in the sheet thickness≤0.2 mm
C: 0.2 mm<Maximum decrease in the sheet thickness≤0.3 mm
D: 0.3 mm<Maximum decrease in the sheet thickness As listed in Table 1, it is understood that the steel sheets Nos. 1 to 17 according to the present invention are excellent in perforation corrosion resistance.

TABLE 1

| | Plating layer I | | Plating layer II | | | Heating conditions | | | | Perforation | |
| | | | | | | Average rate of temperature increase (° C./s) | Heating temperature (° C.) | Holding time (s) | Cooling rate (° C./s) | | |
| Steel sheet No. | Ni content (% by mass) | Coating mass (g/m$^2$) | Ni content (% by mass) | Coating mass (g/m$^2$) | η phase content (% by mass) | | | | | corrosion resistance | Notes |
|---|---|---|---|---|---|---|---|---|---|---|---|
| 1 | 100 | 0.05 | 12 | 45 | 0 | 20 | 900 | 0 | 50 | B | Inventive example |
| 2 | 60 | 0.05 | 12 | 45 | 0 | 20 | 900 | 0 | 50 | C | Inventive example |

TABLE 1-continued

| | Plating layer I | | Plating layer II | | | Heating conditions | | | | Perforation corrosion resistance | Notes |
|---|---|---|---|---|---|---|---|---|---|---|---|
| Steel sheet No. | Ni content (% by mass) | Coating mass (g/m$^2$) | Ni content (% by mass) | Coating mass (g/m$^2$) | η phase content (% by mass) | Average rate of temperature increase (° C./s) | Heating temperature (° C.) | Holding time (s) | Cooling rate (° C./s) | | |
| 3 | 100 | 0.01 | 12 | 45 | 0 | 20 | 900 | 0 | 50 | C | Inventive example |
| 4 | 100 | 0.5 | 12 | 45 | 0 | 20 | 900 | 0 | 50 | B | Inventive example |
| 5 | 100 | 5 | 12 | 45 | 0 | 20 | 900 | 0 | 50 | B | Inventive example |
| 6 | 100 | 0.05 | 10 | 45 | 1 | 20 | 900 | 0 | 50 | B | Inventive example |
| 7 | 100 | 0.05 | 18 | 45 | 0 | 20 | 900 | 0 | 50 | B | Inventive example |
| 8 | 100 | 0.05 | 25 | 45 | 0 | 20 | 900 | 0 | 50 | B | Inventive example |
| 9 | 100 | 0.05 | 12 | 10 | 0 | 20 | 900 | 0 | 50 | C | Inventive example |
| 10 | 100 | 0.05 | 12 | 60 | 0 | 20 | 900 | 0 | 50 | B | Inventive example |
| 11 | 100 | 0.05 | 12 | 90 | 0 | 20 | 900 | 0 | 50 | A | Inventive example |
| 12 | 100 | 0.05 | 12 | 45 | 0 | 50 | 900 | 0 | 50 | B | Inventive example |
| 13 | 100 | 0.05 | 12 | 45 | 0 | 100 | 900 | 0 | 50 | A | Inventive example |
| 14 | 100 | 0.05 | 12 | 45 | 0 | 20 | 850 | 0 | 50 | B | Inventive example |
| 15 | 100 | 0.05 | 12 | 45 | 0 | 20 | 950 | 0 | 50 | B | Inventive example |
| 16 | 100 | 0.05 | 12 | 45 | 0 | 20 | 900 | 300 | 50 | B | Inventive example |
| 17 | 100 | 0.05 | 12 | 45 | 0 | 20 | 900 | 0 | 20 | B | Inventive example |
| 18 | None | | 12 | 45 | 0 | 20 | 900 | 0 | 50 | D | Comparative example |
| 19 | 55 | 0.05 | 12 | 45 | 0 | 20 | 900 | 0 | 50 | D | Comparative example |
| 20 | 100 | 0.004 | 12 | 45 | 0 | 20 | 900 | 0 | 50 | D | Comparative example |
| 21 | 100 | 0.05 | 9 | 45 | 6 | 20 | 900 | 0 | 50 | D | Comparative example |
| 22 | 100 | 0.05 | 26 | 45 | 0 | 20 | 900 | 0 | 50 | D | Comparative example |
| 23 | 100 | 0.05 | 12 | 9 | 0 | 20 | 900 | 0 | 50 | D | Comparative example |

In this example, forming by hot pressing was not actually performed, but as mentioned above, since the perforation corrosion resistance is influenced by the change in the plating layer due to the heating before hot pressing, particularly by the behavior of Zn in the plating layer, the perforation corrosion resistance of the hot-pressed part is able to be evaluated by the results of this example.

SECOND EXAMPLE

On the surfaces of the base steel sheets, which were the same as those of the first example, by a method similar to the first example, the plating layers I different in Ni contents and coating masses and the plating layers II different in Ni contents, coating masses, and η-phase contents were sequentially formed. Thereafter, on the plating layer II, a composition (a solid content percentage of 15% by mass), which contained any of a Si-containing compound, a Ti-containing compound, an Al-containing compound, a Zr-containing compound, and a Si-and-Zr-containing compound that are described below, and of which the remainder consists of a solvent, was coated. Thereafter, heat drying under the condition in which the maximum attained temperature of the steel sheet was 140° C. was performed, any of a Si-containing compound layer, a Ti-containing compound layer, an Al-containing compound layer, a Zr-containing compound layer, and a Si-and-Zr-containing compound layer that were different in thicknesses was formed, to make steel sheets Nos. 1 to 33. Further, for comparison, a Si-containing compound layer was formed on a galvannealed steel sheet (GA) that was made by subjecting the above mentioned base steel sheet to hot-dip plating and alloying to make a steel sheet No. 34. Tables 2 and 3 list the steel sheets Nos. 1 to 34 thus made.

As the Si-containing compound, the Ti-containing compound, the Al-containing compound, and the Zr-containing compound, the following compounds were used.

Silicone resin: KR-242A manufactured by Shin-Etsu Chemical Co., Ltd.

Lithium silicate: lithium silicate 45 manufactured by Nissan Chemical Industries, Ltd.

Colloidal silica: SNOWTEX OS manufactured by Nissan Chemical Industries, Ltd.

Silane coupling agent: KBE-403 manufactured by Shin-Etsu Chemical Co., Ltd.

Titanium coupling agent: ORGATIX TA-22 manufactured by Matsumoto Fine Chemical Co., Ltd.

Lithium titanate: lithium titanate manufactured by Titan Kogyo, Ltd.

Sodium aluminate: NA-170 manufactured by Asahi Chemical Co., Ltd.

Aluminum coupling agent: PLENACT AL-M manufactured by Ajinomoto Fine-Techno Co., Inc.

Zirconium acetate: Zirconium acetate manufactured by SANEI KAKO Co., Ltd.

Zirconium coupling agent: ORGATIX ZA-65 manufactured by Matsumoto Fine Chemical Co., Ltd.

Further, a solvent for using silicone resin as the compound was a thinner of ethylene glycol monobutyl ether and petroleum naphtha at a mass ratio of 55/45 respectively. Further, a solvent for using a substance other than the silicone resin as the compound was deionized water.

The steel sheets Nos. 1 to 34, which were thus obtained, which each sequentially had, on the surface thereof: the plating layer I, the plating layer II, and the compound layer; or the galvannealed layer and the compound layer, and which are listed in Tables 2 and 3, were each heated in an electric furnace or by direct electric conduction and thereafter, cooled while being sandwiched between molds made of aluminum. Thereafter, the evaluation of the perforation corrosion resistance similar to the first example and evaluation of paint adhesion described below were performed. Tables 2 and 3 list, for each steel sheet, the heating conditions and the cooling rate, and results of the evaluations of the perforation corrosion resistance and paint adhesion.

Paint adhesion: Samples were taken from the steel sheets after heat treatment and subjected to a chemical conversion treatment under standard conditions using PB-SX35 manufactured by Nihon Parkerizing Co., Ltd, and thereafter, film formation of a film thickness of 20 μm was performed under baking conditions at 170° C. for 20 minutes using an electrodeposition paint, GT-10HT gray, manufactured by Kansai Paint Co., Ltd. to prepare coating test pieces. Next, cuts penetrating up to the substrate steel were made on the surface of the prepared test-pieces which had been subjected to the chemical conversion treatment and the electrodeposition coating, in a cross-cut pattern (10 by 10, 1 mm intervals) with a cutter knife, and a cross cut tape peel test of sticking and peeling using an adhesive tape was performed. Results of the cross cut tape peel test were evaluated on the basis of the following criteria. When the result of the evaluation was "A" or "B", the paint adhesion was considered to be excellent.

A: No peeling
B: Peeled in 1 to 10 sections
C: Peeled in 11 to 30 sections
D: Peeled in 31 sections or more As listed in Tables 2 and 3, it is understood that in the inventive examples, by providing the compound layer, in addition to excellence in paint adhesion, excellence in perforation corrosion resistance is achieved.

TABLE 2

| | Plating layer I | | Plating layer II | | | Si, Ti, Al, or Zr—containing compound layer | | Heating conditions | | | | Perforation corrosion resistance | Paint adhesion | Notes |
|---|---|---|---|---|---|---|---|---|---|---|---|---|---|---|
| Steel sheet No. | Ni content (% by mass) | Coating mass (g/m$^2$) | Ni content (% by mass) | Coating mass (g/m$^2$) | η phase content (% by mass) | Compound | Thickness (μm) | Average rate of temperature increase (° C./s) | Heating temperature (° C.) | Holding time (s) | Cooling rate (° C./s) | | | |
| 1 | 100 | 0.05 | 12 | 45 | 0 | Silicone resin | 0.5 | 20 | 900 | 0 | 50 | B | A | Inventive example |
| 2 | 100 | 0.05 | 12 | 45 | 0 | Lithium silicate | 0.5 | 20 | 900 | 0 | 50 | B | A | Inventive example |
| 3 | 100 | 0.05 | 12 | 45 | 0 | Colloidal silica | 0.5 | 20 | 900 | 0 | 50 | B | A | Inventive example |
| 4 | 100 | 0.05 | 12 | 45 | 0 | Silane coupling agent | 0.5 | 20 | 900 | 0 | 50 | B | A | Inventive example |
| 5 | 100 | 0.05 | 12 | 45 | 0 | Titanium coupling agent | 0.5 | 20 | 900 | 0 | 50 | B | A | Inventive example |
| 6 | 100 | 0.05 | 12 | 45 | 0 | Lithium titanate | 0.5 | 20 | 900 | 0 | 50 | B | A | Inventive example |
| 7 | 100 | 0.05 | 12 | 45 | 0 | Sodium aluminate | 0.5 | 20 | 900 | 0 | 50 | B | A | Inventive example |
| 8 | 100 | 0.05 | 12 | 45 | 0 | Aluminum coupling agent | 0.5 | 20 | 900 | 0 | 50 | B | A | Inventive example |
| 9 | 100 | 0.05 | 12 | 45 | 0 | Zirconium acetate | 0.5 | 20 | 900 | 0 | 50 | B | A | Inventive example |
| 10 | 100 | 0.05 | 12 | 45 | 0 | Zirconium coupling agent | 0.5 | 20 | 900 | 0 | 50 | B | A | Inventive example |
| 11 | 100 | 0.05 | 12 | 45 | 0 | Silane coupling agent + zirconium coupling agent | 0.5 | 20 | 900 | 0 | 50 | B | A | Inventive example |
| 12 | 100 | 0.05 | 12 | 45 | 0 | — | — | 20 | 900 | 0 | 50 | B | C | Inventive example |
| 13 | 100 | 0.05 | 12 | 45 | 0 | Silicone resin | 0.1 | 20 | 900 | 0 | 50 | B | B | Inventive example |
| 14 | 100 | 0.05 | 12 | 45 | 0 | Silicone resin | 0.4 | 20 | 900 | 0 | 50 | B | A | Inventive example |

TABLE 2-continued

| | Plating layer I | | Plating layer II | | | Si, Ti, Al, or Zr—containing compound layer | | Heating conditions | | | | | | |
|---|---|---|---|---|---|---|---|---|---|---|---|---|---|---|
| | | | | | η phase content | | | Average rate of temperature increase | Heating temperature | Holding time | Cooling rate | Perforation corrosion resistance | Paint adhesion | |
| Steel sheet No. | Ni content (% by mass) | Coating mass (g/m²) | Ni content (% by mass) | Coating mass (g/m²) | (% by mass) | Compound | Thickness (μm) | (° C./s) | (° C.) | (s) | (° C./s) | | | Notes |
| 15 | 100 | 0.05 | 12 | 45 | 0 | Silicone resin | 2.0 | 20 | 900 | 0 | 50 | B | A | Inventive example |
| 16 | 100 | 0.05 | 12 | 45 | 0 | Silicone resin | 3.0 | 20 | 900 | 0 | 50 | B | B | Inventive example |
| 17 | 100 | 0.05 | 12 | 45 | 0 | Silicone resin | 4.0 | 20 | 900 | 0 | 50 | C | B | Inventive example |
| 18 | 60 | 0.05 | 12 | 45 | 0 | Silicone resin | 0.5 | 20 | 900 | 0 | 50 | C | A | Inventive example |
| 19 | 100 | 0.01 | 12 | 45 | 0 | Silicone resin | 0.5 | 20 | 900 | 0 | 50 | C | A | Inventive example |

TABLE 3

| | Plating layer I | | Plating layer II | | | Si, Ti, Al, or Zr—containing compound layer | | Heating conditions | | | | | | |
|---|---|---|---|---|---|---|---|---|---|---|---|---|---|---|
| | | | | | η phase content | | | Average rate of temperature increase | Heating temperature | Holding time | Cooling rate | Perforation corrosion resistance | Paint adhesion | |
| Steel sheet No. | Ni content (% by mass) | Coating mass (g/m²) | Ni content (% by mass) | Coating mass (g/m²) | (% by mass) | Compound | Thickness (μm) | (° C./s) | (° C.) | (s) | (° C./s) | | | Notes |
| 20 | 100 | 0.5 | 12 | 45 | 0 | Silicone resin | 0.5 | 20 | 900 | 0 | 50 | B | A | Inventive example |
| 21 | 100 | 5 | 12 | 45 | 0 | Silicone resin | 0.5 | 20 | 900 | 0 | 50 | B | A | Inventive example |
| 22 | 100 | 0.05 | 10 | 45 | 1 | Silicone resin | 0.5 | 20 | 900 | 0 | 50 | B | A | Inventive example |
| 23 | 100 | 0.05 | 18 | 45 | 0 | Silicone resin | 0.5 | 20 | 900 | 0 | 50 | B | A | Inventive example |
| 24 | 100 | 0.05 | 25 | 45 | 0 | Silicone resin | 0.5 | 20 | 900 | 0 | 50 | B | A | Inventive example |
| 25 | 100 | 0.05 | 12 | 10 | 0 | Silicone resin | 0.5 | 20 | 900 | 0 | 50 | C | A | Inventive example |
| 26 | 100 | 0.05 | 12 | 60 | 0 | Silicone resin | 0.5 | 20 | 900 | 0 | 50 | B | A | Inventive example |
| 27 | 100 | 0.05 | 12 | 90 | 0 | Silicone resin | 0.5 | 20 | 900 | 0 | 50 | A | A | Inventive example |
| 28 | 100 | 0.05 | 12 | 45 | 0 | Silicone resin | 0.5 | 50 | 900 | 0 | 50 | B | A | Inventive example |
| 29 | 100 | 0.05 | 12 | 45 | 0 | Silicone resin | 0.5 | 100 | 900 | 0 | 50 | A | A | Inventive example |
| 30 | 100 | 0.05 | 12 | 45 | 0 | Silicone resin | 0.5 | 20 | 850 | 0 | 50 | B | A | Inventive example |
| 31 | 100 | 0.05 | 12 | 45 | 0 | Silicone resin | 0.5 | 20 | 950 | 0 | 50 | B | A | Inventive example |
| 32 | 100 | 0.05 | 12 | 45 | 0 | Silicone resin | 0.5 | 20 | 900 | 300 | 50 | B | A | Inventive example |
| 33 | 100 | 0.05 | 12 | 45 | 0 | Silicone resin | 0.5 | 20 | 900 | 0 | 20 | B | A | Inventive example |
| 34 | GA, coating mass 45 g/m² | | | | — | Silicone resin | 0.5 | 20 | 900 | 0 | 50 | C | D | Comparative example |

In the present example, forming by hot pressing was not actually performed, but similarly to the perforation corrosion resistance, the paint adhesion of the hot-pressed part is able to be evaluated by the results of the present example.

The present invention is applicable to manufacture of parts such as chassis parts and body structural parts of automobiles by hot pressing.

The invention claimed is:

1. A steel sheet for hot pressing, comprising on a surface of a base steel sheet:
   a plating layer I on the surface of the base steel sheet comprising (i) 60% by mass or more of Ni and (ii) a remainder comprising Zn and inevitable impurities, a coating mass thereof being 0.01 to 5 g/m²; and a plating layer II on the plating layer I comprising (i) 10 to 25% by mass of Ni and (ii) a remainder comprising Zn and inevitable impurities, a coating mass thereof being 10 to 90 g/m$^2$.

2. The steel sheet for hot pressing according to claim 1, further comprising, on the plating layer H, at least one kind of compound layer selected from: a Si-containing compound layer; a Ti-containing compound layer; an Al-containing compound layer; and a Zr-containing compound layer.

3. The steel sheet for hot pressing according to claim 2, wherein the base steel sheet has a component composition comprising, in % by mass: 0.15 to 0.5% of C; 0.05 to 2.0% of Si; 0.5 to 3% of Mn; 0.1% or less of P; 0.05% or less of S; 0.1% or less of Al; and 0.01% or less of N, the remainder of the component composition comprising Fe and inevitable impurities.

4. The steel sheet for hot pressing according to claim 3, wherein the base steel sheet further contains, in % by mass, 0.003 to 0.03% of Sb.

5. The steel sheet for hot pressing according to claim 3, wherein the base steel sheet further contains at least one kind selected from, in % by mass: 0.01 to 1% of Cr; 0.2% or less of Ti; and 0.0005 to 0.08% of B.

6. The steel sheet for hot pressing according to claim 5, wherein the base steel sheet further contains, in % by mass, 0.003 to 0.03% of Sb.

7. The steel sheet for hot pressing according to claim 1, wherein the base steel sheet has a component composition comprising, in % by mass: 0.15 to 0.5% of C; 0.05 to 2.0% of Si; 0.5 to 3% of Mn; 0.1% or less of P; 0.05% or less of S; 0.1% or less of Al; and 0.01% or less of N, the remainder of the component composition comprising Fe and inevitable impurities.

8. The steel sheet for hot pressing according to claim 7, wherein the base steel sheet further contains, in % by mass, 0.003 to 0.03% of Sb.

9. The steel sheet for hot pressing according to claim 7, wherein the base steel sheet further contains at least one kind selected from, in % by mass: 0.01 to 1% of Cr; 0.2% or less of Ti; and 0.0005 to 0.08% of B.

10. The steel sheet for hot pressing according to claim 9, wherein the base steel sheet further contains, in % by mass, 0.003 to 0.03% of Sb.

11. A method of manufacturing a hot-pressed part, comprising:
heating the steel sheet for hot pressing according to claim 1 to a temperature range from an Ac$_3$ transformation point to 1000° C.; and
thereafter hot pressing the steel sheet for hot pressing.

12. The method of manufacturing a hot-pressed part according to claim 11, wherein when heating to the temperature range from the Ac$_3$ transformation point to 1000° C., the heating is performed at an average rate of temperature increase of 100° C./s or greater.

13. A method of manufacturing a hot-pressed part, comprising:
heating the steel sheet for hot pressing according to claim 2 to a temperature range from an Ac$_3$ transformation point to 1000° C.; and
thereafter hot pressing the steel sheet for hot pressing.

14. The method of manufacturing a hot-pressed part according to claim 13, wherein when heating to the temperature range from the Ac$_3$ transformation point to 1000° C., the heating is performed at an average rate of temperature increase of 100° C./s or greater.

15. A method of manufacturing a hot-pressed part, comprising:
heating the steel sheet for hot pressing according to claim 7 to a temperature range from an Ac$_3$ transformation point to 1000° C.; and
thereafter hot pressing the steel sheet for hot pressing.

16. The method of manufacturing a hot-pressed part according to claim 15, wherein when heating to the temperature range from the Ac$_3$ transformation point to 1000° C., the heating is performed at an average rate of temperature increase of 100° C./s or greater.

17. A method of manufacturing a hot-pressed part, comprising:
heating the steel sheet for hot pressing according to claim 8 to a temperature range from an Ac$_3$ transformation point to 1000° C.; and
thereafter hot pressing the steel sheet for hot pressing.

18. The method of manufacturing a hot-pressed part according to claim 17, wherein when heating to the temperature range from the Ac$_3$ transformation point to 1000° C., the heating is performed at an average rate of temperature increase of 100° C./s or greater.

19. A method of manufacturing a hot-pressed part, comprising:
heating the steel sheet for hot pressing according to claim 9 to a temperature range from an Ac$_3$ transformation point to 1000° C.; and
thereafter hot pressing the steel sheet for hot pressing.

20. The method of manufacturing a hot-pressed part according to claim 19, wherein when heating to the temperature range from the Ac$_3$ transformation point to 1000° C., the heating is performed at an average rate of temperature increase of 100° C./s or greater.

* * * * *